Aug. 11, 1931.  W. I. KENISON  1,818,335
GRAIN SAVER
Filed April 24, 1929
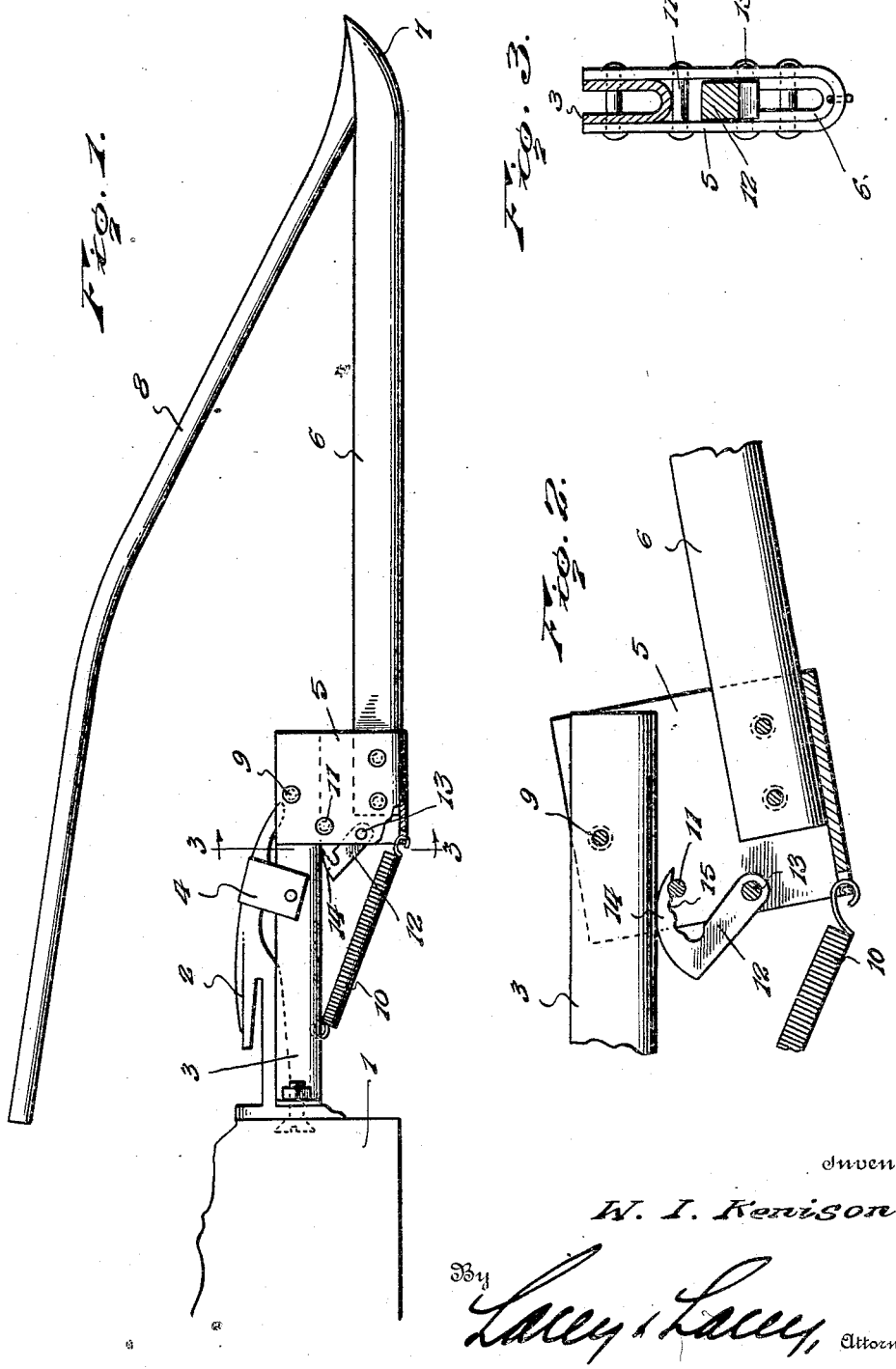
Inventor
W. I. Kenison.
By Lacey & Lacey, Attorneys Patented Aug. 11, 1931

1,818,335

UNITED STATES PATENT OFFICE

WILLIAM I. KENISON, OF SOLOMON, KANSAS

GRAIN SAVER

Application filed April 24, 1929. Serial No. 357,784.

This invention is a device to be secured to the platform of a harvester or mowing machine and to run in advance of the cutting apparatus to lift fallen grain so that it will be supported in proper position to be cut by the mowing apparatus and drop onto the platform. The invention also seeks to provide a device for the stated purpose which may be easily adjusted so that it will run at a desired angle to the platform without digging into the ground. Other objects of the invention will appear incidentally in the course of the following description, and the invention resides in certain novel features which will be hereinafter first fully described and then more particularly defined in the appended claims.

In the drawings:

Figure 1 is a side elevation, partly broken away and in section, of my device in its operative position, Fig. 2 is an enlarged detail section of a portion of the device showing the same in a different position from that shown in Fig. 1, and Fig. 3 is an enlarged detail section on the line 3—3 of Fig. 1.

In the drawings, the reference numeral 1 indicates a portion of a harvester platform and the numeral 2 indicates the guard fingers which are secured to the front of the platform and form guides for the sickle or knives and cooperate with the same to sever the grain heads from the stalks. In carrying out the present invention, an arm 3 is secured to the platform at the side of each guard finger 2 and projects forwardly beyond the guard finger, this arm being preferably U-shaped in cross section, as shown in Fig. 3, whereby it may be fitted under and partly house the bottom of the guard finger and be secured to the platform frame by the same bolts that secure the guard finger thereto. Near the front end of the attaching arm 3, a clip 4 is secured thereto to pass over the guard finger and thereby aid in maintaining the relative positions of the guard finger and the attaching arm. A saddle 5 is pivoted to the attaching arm 3 adjacent the front end thereof and this saddle, as shown most clearly in Fig. 3, is also of a U formation. Secured in the lower portion of the saddle and extending forwardly therefrom is a guard arm 6 also U-shaped in cross section which is adapted to run upon the ground in advance of the harvester, as will be readily understood upon reference to Fig. 1. The front extremity of this guard arm is tapered, as indicated at 7, whereby it may readily clear pebbles or other slight obstructions and extending upwardly and rearwardly from the extremity of the guard arm is a lifting rod 8 which in operation will pass under the fallen corn stalks and lift them into a substantially upright position, supporting them in such position until the heads have been severed by the sickle. The saddle 5 is pivoted to the attaching arm 3 at the point 9 and a contractile spring 10 is attached to the lower rear corner of the saddle and to the arm 3 at the rear of the saddle so as to hold the saddle and the guard arm normally in the position shown in Fig. 1 whereby the guard will run upon the ground in proper position to engage under the fallen grain stalks. The spring 10 obviously tends to throw the front end of the guard arm downwardly and the upwardly and forwardly tapered form of the front end 7 of the guard will permit it to run readily over the ground without digging thereinto under normal conditions, notwithstanding the force exerted by this spring. Said force is limited by a stop pin 11 inserted through the saddle adjacent the rear edge thereof and adapted to impinge against the under side of the guard arm 3, as shown. It may be desirable under some conditions to permit less movement of the guard arm than is provided for by the stop pin 11 and to this end there is provided a latch or adjustable stop 12 in the form of a small bar pivoted at its lower end, as at 13, within the saddle below the stop pin 11 and provided at its upper end with a forwardly projecting hook or lip 14 adapted to enter between the stop pin and the under side of the attaching arm, as shown in Fig. 2. The hook 14 is tapered so that it may readily enter between the stop pin and the arm and is provided with notches 15 in its under edge adapted to seat upon the stop pin and thereby maintain the set position of the latch, as will be understood upon reference to Fig. 2.

It will be readily noted that I have provided a very simple and inexpensive device which may be readily applied to any harvester and which will run in advance of the harvester platform and lift the fallen grain so that it will be presented to the cutter in proper position to permit the heads to be severed. Heretofore much grain has been lost either because it was not lifted from the ground at all or was insufficiently raised and was not presented to the cutter.

Having thus described the invention, I claim:

1. A device for the purpose set forth comprising an attaching arm, a saddle pivoted to and depending from the front end of the attaching arm, a guard arm secured in and extending forwardly from the saddle, a lifting rod extending upwardly and rearwardly from the guard arm, a stop pin in the saddle below the attaching arm, and a contractile spring attached to and extending between the rear end of the saddle and the attaching arm.

2. A device for the purpose set forth comprising an attaching arm, a saddle pivoted to and depending from the front end of the attaching arm, a guard arm secured in and extending forwardly from the saddle, a lifting rod extending upwardly and rearwardly from the guard arm, a stop pin in the saddle below the attaching arm, a contractile spring attached to and extending between the saddle and the attaching arm, and a latch carried by the saddle and insertible between the stop pin and the attaching arm.

3. A device for the purpose set forth comprising an attaching arm, a saddle pivoted to and depending from the front end of the attaching arm, a guard arm secured in and extending forwardly from the saddle, a lifting rod extending upwardly and rearwardly from the guard arm, a stop pin in the saddle below the attaching arm, a contractile spring attached to and extending between the saddle and the attaching arm, and a latch carried by the saddle, said latch comprising a bar pivoted at its lower end in the saddle and provided at its upper end with a forwardly extending tapered hook engageable between the stop pin and the under side of the attaching arm.

In testimony whereof I affix my signature.

WILLIAM I. KENISON. [L. S.]